United States Patent
Silver

(10) Patent No.: US 7,149,309 B1
(45) Date of Patent: Dec. 12, 2006

(54) TIME-DEPENDENT AUTHORIZATION

(75) Inventor: Yonatan Silver, Jerusalem (IL)

(73) Assignee: NDS Ltd., Middlesex (GB)

( * ) Notice: Subject to any disclaimer, the term of this patent is extended or adjusted under 35 U.S.C. 154(b) by 0 days.

(21) Appl. No.: 09/432,668

(22) Filed: Nov. 2, 1999

(30) Foreign Application Priority Data

Feb. 11, 1999 (IL) .................................. 128506

(51) Int. Cl.
  *H04L 9/00* (2006.01)
  *H04N 7/167* (2006.01)
(52) U.S. Cl. ........................................ 380/229; 705/52
(58) Field of Classification Search ................. 705/51, 705/52; 725/25, 28, 29; 345/700, 716, 741; 380/229
  See application file for complete search history.

(56) References Cited

U.S. PATENT DOCUMENTS

| 4,081,754 A | 3/1978 | Jackson |
| 4,163,254 A | 7/1979 | Block et al. ................. 358/122 |
| 4,225,884 A | 9/1980 | Block et al. ................. 358/122 |
| 4,264,924 A | 4/1981 | Freeman ...................... 358/86 |
| 4,264,925 A | 4/1981 | Freeman et al. ............... 358/86 |
| 4,528,589 A | 7/1985 | Block et al. ................. 358/122 |
| 4,567,516 A | 1/1986 | Scherer et al. ............... 358/122 |
| 4,602,279 A | 7/1986 | Freeman ...................... 358/86 |
| 4,706,121 A | 11/1987 | Young ......................... 358/142 |
| 4,795,497 A | 1/1989 | McConnell et al. ........... 134/18 |
| 4,823,385 A | 4/1989 | Hegendörfer ................ 380/10 |
| 4,977,455 A | 12/1990 | Young ......................... 358/142 |
| 4,989,245 A | 1/1991 | Bennett ....................... 380/23 |
| 5,020,129 A | 5/1991 | Martin et al. .................. 455/4 |
| 5,033,085 A | 7/1991 | Rew ........................... 380/20 |
| 5,036,537 A | 7/1991 | Jeffers et al. ................. 380/20 |
| 5,051,822 A | 9/1991 | Rhoades ....................... 358/86 |
| 5,051,837 A | 9/1991 | McJunkin |
| 5,060,079 A | 10/1991 | Rufus-Isaacs ................. 358/84 |
| 5,151,789 A | 9/1992 | Young ...................... 358/194.1 |
| 5,168,372 A | 12/1992 | Sweetser |
| 5,181,107 A | 1/1993 | Rhoades ....................... 358/86 |
| 5,231,661 A | 7/1993 | Harnum et al. |
| 5,282,249 A | 1/1994 | Cohen et al. ................. 380/23 |
| 5,331,353 A | 7/1994 | Levenson et al. |
| 5,353,121 A | 10/1994 | Young et al. ................ 348/563 |
| 5,382,983 A | 1/1995 | Kwoh et al. |
| 5,393,057 A | 2/1995 | Marnell, II ................... 273/85 |
| 5,459,522 A | 10/1995 | Pint ........................... 348/478 |
| 5,465,113 A | 11/1995 | Gilboy ........................ 348/5.5 |

(Continued)

FOREIGN PATENT DOCUMENTS

EP 0355957 2/1990

(Continued)

OTHER PUBLICATIONS

"Access Control System for the Mac/Packet Family: Eurocrypt," Product Description, Mar. 1989.

(Continued)

*Primary Examiner*—Matthew Smithers
(74) *Attorney, Agent, or Firm*—Ladas and Parry LLP

(57) ABSTRACT

An access control method for use with a broadcast communication network is described. The access control method includes the steps of receiving an encoded program at a subscriber unit via the broadcast communication network, and preventing decoding of the encoded program at the subscriber unit for at least one preselected time period, preselected in accordance with a preference of a user of the subscriber unit. Alternatively, the encoded program received at the subscriber unit may be decoded for at least one preselected time period, preselected in accordance with a preference of the user of the subscriber unit. Related methods and apparatus are also described.

19 Claims, 3 Drawing Sheets

U.S. PATENT DOCUMENTS

| | | | |
|---|---|---|---|
| 5,473,609 A | 12/1995 | Chaney | 370/94.1 |
| 5,479,266 A | 12/1995 | Young et al. | 358/335 |
| 5,479,268 A | 12/1995 | Young et al. | 358/335 |
| 5,481,609 A | 1/1996 | Cohen et al. | 380/16 |
| 5,515,106 A | 5/1996 | Chaney et al. | 348/461 |
| 5,532,754 A | 7/1996 | Young et al. | 348/569 |
| 5,539,449 A | 7/1996 | Blahut et al. | 348/7 |
| 5,539,450 A | 7/1996 | Handelman | 348/12 |
| 5,541,738 A | 7/1996 | Mankovitz | 358/335 |
| 5,548,345 A | 8/1996 | Brian et al. | |
| 5,550,575 A | 8/1996 | West et al. | |
| 5,559,548 A | 9/1996 | Davis et al. | 348/6 |
| 5,575,717 A | 11/1996 | Houriet, Jr. et al. | 463/1 |
| 5,581,270 A | 12/1996 | Smith et al. | 345/2 |
| 5,585,838 A | 12/1996 | Lawler et al. | 348/13 |
| 5,585,858 A | 12/1996 | Harper et al. | 348/485 |
| 5,589,892 A | 12/1996 | Knee et al. | 348/731 |
| 5,592,212 A | 1/1997 | Handelman | 348/12 |
| 5,629,733 A | 5/1997 | Youman et al. | 348/7 |
| 5,630,119 A | 5/1997 | Aristides et al. | 395/601 |
| 5,635,978 A | 6/1997 | Alten et al. | 348/7 |
| 5,657,072 A | 8/1997 | Aristides et al. | 348/13 |
| 5,664,046 A | 9/1997 | Abecassis | 386/125 |
| 5,666,412 A | 9/1997 | Handelman et al. | 380/4 |
| 5,666,645 A | 9/1997 | Thomas et al. | 455/6.1 |
| 5,684,525 A | 11/1997 | Klosterman | 348/12 |
| 5,734,786 A | 3/1998 | Mankovitz | 386/96 |
| 5,745,895 A | 4/1998 | Bingham et al. | 707/10 |
| 5,760,821 A | 6/1998 | Ellis et al. | 348/10 |
| 5,767,894 A | 6/1998 | Fuller et al. | 348/8 |
| 5,774,546 A | 6/1998 | Handelman et al. | 380/4 |
| 5,784,095 A | 7/1998 | Robbins et al. | 348/6 |
| 5,784,763 A | 7/1998 | Cassidy | 24/130 |
| 5,790,201 A | 8/1998 | Antos | 348/552 |
| 5,805,763 A | 9/1998 | Lawler et al. | 386/83 |
| 5,832,471 A | 11/1998 | Fukui | 707/1 |
| 5,852,612 A | 12/1998 | Kostreski et al. | 370/537 |
| 5,862,324 A | 1/1999 | Collins | 395/200.5 |
| 5,917,256 A | 6/1999 | Broadbent | |
| 5,940,073 A | 8/1999 | Klosterman et al. | 345/327 |
| 5,969,748 A | 10/1999 | Casement et al. | 348/7 |
| 5,978,043 A | 11/1999 | Blonstein et al. | 348/569 |
| 6,005,565 A | 12/1999 | Legall et al. | 345/327 |
| 6,020,882 A * | 2/2000 | Kinghorn et al. | 345/716 |
| 6,025,837 A | 2/2000 | Matthews, III et al. | 345/327 |
| 6,061,503 A | 5/2000 | Chamberlain | 395/200.47 |
| 6,091,886 A | 7/2000 | Abecassis | |
| 6,144,376 A | 11/2000 | Connelly | 345/327 |
| 6,144,991 A | 11/2000 | England | 709/205 |
| 6,151,059 A | 11/2000 | Schein et al. | 348/13 |
| 6,163,316 A | 12/2000 | Killian | 345/327 |
| 6,360,367 B1 * | 3/2002 | Yamamoto | 725/25 |
| 6,481,009 B1 * | 11/2002 | Miyakoshi | 725/28 |
| 6,553,566 B1 * | 4/2003 | Grant et al. | 725/28 |

FOREIGN PATENT DOCUMENTS

| | | |
|---|---|---|
| EP | 0409562 | 1/1991 |
| EP | 0461910 | 12/1991 |
| EP | 662769 | 7/1995 |
| WO | 9733434 | 9/1997 |
| WO | 99/01984 | 1/1999 |
| WO | 0001149 | 6/1999 |

OTHER PUBLICATIONS

US 6,118,443, 09/2000, Allison et al. (withdrawn)

* cited by examiner

TIME-DEPENDENT AUTHORIZATION

FIELD OF THE INVENTION

The present invention relates to broadcast communication networks generally, and more particularly to television networks.

BACKGROUND OF THE INVENTION

Modern pay television networks typically employ conditional access modules which provide conditional access to pay television programs distributed via the pay television networks.

The conditional access modules typically enable subscription services, pay-per-view services and impulse-pay-per-view services in which subscribers may view the pay television programs if they agree to pay for the pay television programs.

Aspects of related technology are described in the following references:

U.S. Pat. Nos. 5,282,249 and 5,481,609 to Cohen et al which describe a system for controlling access to broadcast transmissions including a transmitter having a transmission encoder for scrambling the broadcast, a multiplicity of subscriber receivers, each having an identical receiving decoder, containing no cryptographic keys, for descrambling the broadcast and a plurality of selectable and portable executing apparatus each being operatively associatable with a receiving decoder at a partially different given time and each executing generally identical operations to generate a seed for use by the associated receiving decoder to enable the receiving decoder to descramble the broadcast;

U.S. Pat. No. 5,666,412 to Handelman et al which describes a CATV system including a CATV network and apparatus for transmitting over the CATV network information to a multiplicity of subscriber units, each including a CATV decoder and an IC card reader and writer coupled to the CATV decoder, the IC card reader and writer including two separate card receptacles, such that IC cards inserted into the two separate IC card receptacles are separately accessed by the IC card reader and writer;

U.S. Pat. No. 5,774,546 to Handelman et al which describes one IC card with two separate integrated circuits embodied within, wherein each of the separate integrated circuits is separately accessible by an IC card reader and writer;

U.S. patent application Ser. No. 09/105,965 to Tsuria which describes a method for remotely providing parental control in a pay television system in which program guide information is transmitted via a pay television network to a subscriber unit, the program guide information being received and stored at a pay television converter in the subscriber unit, and being displayed on a television upon user request;

PCT patent application PCT/IL98/00307 to Maissel et al which describes a subscriber unit for use in a television system including a television network and transmitting apparatus for transmitting program schedule information, the subscriber unit including a receiving unit for receiving the program schedule information, a profile storage unit for storing at least one viewer preference profile of at least one television viewer, an intelligent agent for customizing the program schedule information based, at least in part, on the viewer preference profile, to produce a program guide including customized program schedule information, and display apparatus for displaying the program guide;

Unpublished Israel patent application 120,684 to Tsuria et al which describes an entertainment system for providing entertainment to a user thereof;

Unpublished Israel patent application 125,141 to Wachtfogel et al which describes a digital television recording message in which sets of parameters provided by a broadcaster, an agent program, and a viewer may be used to enable access to predetermined portions of a television program;

U.S. Pat. No. 5,033,085 to Rew which describes a method for controlling video and audio of a television set using a code in such a manner that a code is set up in a microcomputer of the television set, which is operated normally only when the code is released by input of a key signal corresponding to the code, to output the video and audio signals;

U.S. Pat. No. 5,020,129 to Martin et al which describes remote control of subscriber access to premium programs on a cable television system or the like;

U.S. Pat. Nos. 4,163,254, 4,225,884 and 4,428,589 to Block et al which describe a subscription television system and method in which billing information regarding programs actually viewed by a subscriber of the system is accumulated over non-dedicated telephone lines;

U.S. Pat. No. 5,036,537 to Jeffers et al which describes a geographic black-out method for direct broadcast satellite system;

U.S. Pat. No. 4,989,245 to Bennett which describes a control system and a corresponding method for controlling descrambling within a plurality of jurisdictions of scrambled programs broadcast from at least one of the jurisdictions;

U.S. Pat. No. 5,465,113 to Gilboy which describes a programmable cable controller adapted to accept a time limit and a time period which are input by a viewer and, upon reaching a preset time limit, to block display of a cable channel; and A publication dated March 1989 of the Eurocrypt access control system for the MAC/Packet family.

The disclosures of all references mentioned above and throughout the present specification are hereby incorporated herein by reference.

SUMMARY OF THE INVENTION

The present invention seeks to provide broadcast communication networks which disable viewing authorization at certain selected times.

In the present invention, programs are broadcast encoded, and are decoded for legitimate users. Preferably, authorization to view the programs may be disabled for selected time periods by one of several disabling methods. The selected time periods may be: periodic, such as every weekend, or every evening between 8:00 PM and 10:00 PM; or specific, such as at a selected time on a specific date.

If an integrated circuit (IC) card, generally referred to as a smart card, is used with a set-top box (STB) to decode broadcast transmissions, the smart card may be programmed during manufacturing, or prior to selling to a user, to include at least one selected time period during which authorization to view programs must be disabled. The at least one selected time period may be either determined by a manufacturer or a salesperson, or provided by the user.

Alternatively or additionally, the user may program a set-top box (STB) at a subscriber unit to determine at least one selected time period during which authorization to view the programs will be disabled. Preferably, the user may input disabling data which may include at least a portion of the characteristics of the at least one time period. The characteristics of the at least one time period preferably determines the at least one time period and includes, for example, a beginning time of the at least one time period and an ending time of the at least one time period. Alternatively, the characteristics of the at least one time period may include a beginning time, and a length of the at least one time period.

Alternatively or additionally, in order to determine the at least one time period, the user may contact a broadcasting headend and request to participate in a service which offers a possibility of disabling authorization to view programs at selected time periods. The user may then provide at least one time period during which he wants to disable authorization to view programs.

The characteristics of the at least one time period may preferably be stored in a memory at the subscriber unit or in a removable smart card which is owned by the user.

Preferably, during the at least one time period, authorization to view programs is disabled, and a message indicating that authorization to view programs is disabled may be displayed on a display at a subscriber unit. Additionally, during the at least one time period, non-decoded unclear signals are displayed on the display.

Preferably, in response to a selection made by the user of at least one time period during which authorization to view programs should be disabled, decoding of programs transmitted within the at least one time period is disabled. Alternatively, programs at the headend are associated with individually addressed disabling data. The individually addressed disabling data may include a disabling code which is individually addressed to the subscriber unit and is processed at the STB. The disabling code preferably determines conditions for disabling viewing of television programs, such as times when viewing is disabled and channels at which viewing is disabled.

Preferably, a processor in the STB checks whether the disabling code is addressed to the subscriber unit, and if the disabling code is addressed to the subscriber unit, the processor checks whether a current time is within the at least one time period, for example, between a beginning time of the at least one time period and an ending time of the at least one time period, and disables authorization to view programs at channels specified by the disabling code as long as the current time is within the at least one time period. The current time may be either obtained from an internal clock of the processor or from the broadcast transmissions.

The disabling code may preferably be associated with a payment code determining a payment rate. Accordingly, only users who request the service which offers a possibility to disable authorization to view programs at selected time periods, and pay for the service, may disable viewing of programs at selected time periods. Alternatively or additionally, the payment rate may also determine a rate which is reduced or increased with respect to a regular rate of the programs.

There is thus provided in accordance with a preferred embodiment of the present invention an access control method for use with a broadcast communication network, the method including receiving an encoded program at a subscriber unit via the broadcast communication network, and preventing decoding of the encoded program at the subscriber unit for at least one preselected time period, preselected in accordance with a preference of a user of the subscriber unit.

Preferably, the step of preventing decoding includes the step of disabling display of the program in a clear form at the subscriber unit for the at least one preselected time period in response to a selection inputted by the user.

Alternatively, the step of preventing decoding includes the step of disabling display of the program in a clear form at the subscriber unit for the at least one preselected time period in response to disabling data inputted at a headend of the broadcast communication network. The disabling data may include addressed restriction information which is individually addressed to the subscriber unit.

Further alternatively, the step of preventing decoding includes the step of disabling display of the program in a clear form at the subscriber unit for the at least one preselected time period in response to disabling data resident in a removable security element which is operatively associated with the subscriber unit. The disabling data resident in the removable security element is preferably stored in the removable security element before the removable security element is provided to the user for use thereby.

The disabling data in any of the alternative embodiments preferably includes at least a portion of characteristics of the at least one preselected time period. The characteristics of the at least one preselected time period preferably includes at least one of the following: a beginning time of the at least one preselected time period and an ending time of the at least one preselected time period, and a beginning time of the at least one preselected time period and a length of the at least one preselected time period.

In the embodiment in which the disabling data is resident in the removable security element the characteristics of the at least one preselected time period may preferably include a beginning time of the at least one preselected time period, beginning after the removable security element is inserted in a removable security element receptacle in the subscriber unit for a specified time period, and a time remaining to an end of a current day.

Preferably, in any of the alternative embodiments the step of preventing decoding may include the step of disabling display of a program in a clear form at a channel to which the subscriber unit is tuned during the at least one preselected time period. The program may be a pay program.

Preferably, the program includes at least one of the following: a television program, a pay television program, a commercial, a video clip, a program guide, an electronic program guide (EPG), data, multimedia information, a hypermedia link, a computer program, computer data, an application which may be downloaded, a program applet, teletext information, an audio program, a textual information program, an image generating program, electronic-mail, and voice mail.

The at least one preselected time period may preferably include at least one of the following: a periodic time period, and a specific time period.

In the alternative embodiment in which the selection inputted by the user is used to disable display of the program in a clear form, the step of preventing decoding may include the steps of generating a disabling code in response to the selection inputted by the user, and employing the disabling code to prevent decoding of the program for the at least one preselected time period.

In the alternative embodiment in which disabling data inputted at a headend of the broadcast communication network is used to disable display of the program in a clear form, the step of preventing decoding may include the steps of transmitting the program associated with an individually addressed disabling code from the headend, receiving the program with the associated individually addressed disabling code at the subscriber unit, separating the individually addressed disabling code from the program to produce a separated individually addressed disabling code, processing the separated individually addressed disabling code to determine whether the individually addressed disabling code is addressed to the subscriber unit, and preventing decoding of the program for the at least one preselected time period if the individually addressed disabling code is addressed to the subscriber unit.

Preferably, in any of the alternative embodiments the disabling code may be associated with a payment code determining a payment rate.

In the embodiment in which the disabling data is resident in the removable security element, the step of preventing decoding may preferably include the steps of generating a disabling code in response to the disabling data resident in the removable security element, and employing the disabling code to prevent decoding of the program for the at least one preselected time period.

Preferably, in any of the alternative embodiments, the disabling code is included in one of an Entitlement Control Message (ECM) and an Entitlement Management Message (EMM).

Further preferably, the at least one preselected time period may be selected to immediately follow an additional time period during which programs broadcast via the broadcast communication network are displayed in a clear form.

There is also provided in accordance with a preferred embodiment of the present invention an access control method for use with a broadcast communication network, the method including receiving an encoded program at a subscriber unit via the broadcast communication network, and enabling decoding of the encoded program at the subscriber unit for at least one preselected time period, preselected in accordance with a preference of a user of the subscriber unit.

Further in accordance with a preferred embodiment of the present invention there is provided apparatus at a subscriber unit for providing access control to broadcast transmissions, the apparatus including a receiver and decoder unit operative to receive and decode a program broadcast via a broadcast communication network in an encoded form, and a processor operatively associated with the receiver and decoder unit and operative to disable decoding of the program at the receiver and decoder unit for at least one preselected time period, preselected in accordance with a preference of a user of the subscriber unit.

Preferably, the apparatus also includes a user input device operatively associated with the processor and operative to enable input of data determining the at least one preselected time period. The user input device preferably includes at least one of the following: a keypad, a remote control unit, and a mouse pointer.

Additionally, the apparatus includes a memory for storing the data determining the at least one preselected time period.

Preferably, the receiver and decoder unit is also operative to receive the program with a disabling code associated therewith, to separate the disabling code from the program, and to provide the disabling code to the processor, and the processor is also operative to determine whether the disabling code is addressed to the subscriber unit, and to prevent decoding of the program for the at least one preselected time period if the disabling code is addressed to the subscriber unit.

Additionally, the apparatus also includes a security element associated with the processor and operative to provide to the processor disabling data resident in the security element, the disabling data being operative to disable decoding of the program at the subscriber unit for the at least one preselected time period. The security element preferably includes a removable security element. The removable security element preferably includes a smart card.

In accordance with another preferred embodiment of the present invention there is also provided apparatus at a subscriber unit for providing access control to broadcast transmissions, the apparatus including a receiver and decoder unit operative to receive and decode a program broadcast in an encoded form, and a processor operatively associated with the receiver and decoder unit and operative to disable decoding of the program at the subscriber unit for at least one preselected time period upon receipt of a time period disablement input.

There is also provided in accordance with yet another preferred embodiment of the present invention apparatus at a subscriber unit for providing access control to broadcast transmissions, the apparatus including a receiver and decoder unit operative to receive and decode a program broadcast in an encoded form, and a processor operatively associated with the receiver and decoder unit and operative to enable decoding of the program at the subscriber unit for at least one preselected time period, preselected in accordance with a preference of a user of the subscriber unit.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
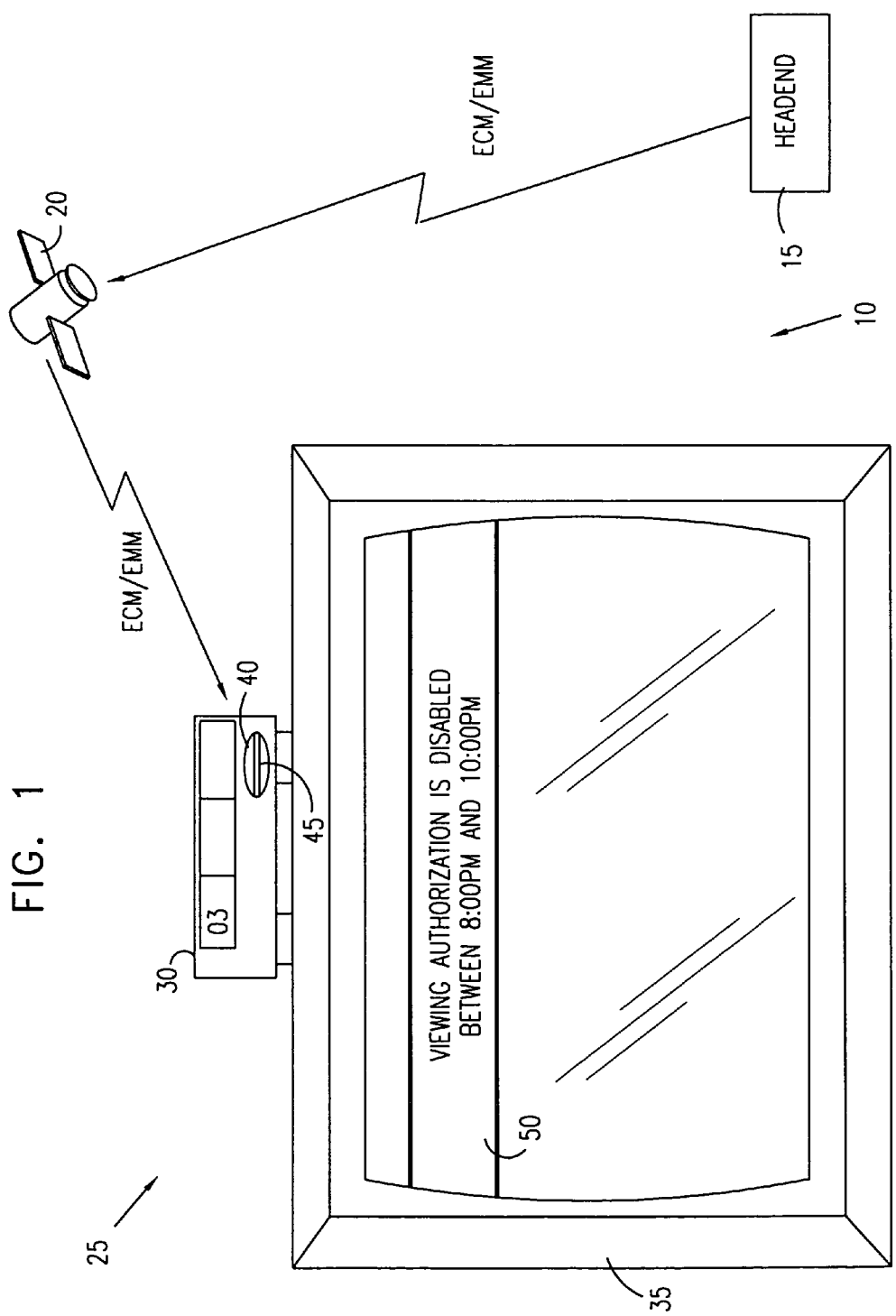
FIG. 1 is a simplified pictorial illustration of a preferred implementation of a broadcast communication network having means for providing control of access to broadcast transmissions, the network being constructed and operative in accordance with a preferred embodiment of the present invention.

Reference is now made to FIG. 1 which is a simplified pictorial illustration of a preferred implementation of a broadcast communication network 10 having means for providing control of access to broadcast transmissions, the broadcast communication network 10 being constructed and operative in accordance with a preferred embodiment of the present invention.

Preferably, the broadcast communication network 10 may include a satellite television network which includes a headend 15 that broadcasts programs to a multiplicity of subscriber units via a satellite 20. Alternatively or additionally, the broadcast communication network 10 may include a wireless terrestrial broadcast television network, and the headend 15 may include a terrestrial transmitting headend. Further alternatively or additionally, the broadcast communication network 10 may include a cable television network which broadcasts the programs over cables, such as coaxial cables or fiber optic cables, and the headend 15 may include a cable headend.

The terms "program" and "television program" are interchangeably used throughout the specification and claims to include various types of transmitted material, such as television programs, pay television programs, commercials, video clips, program guides and electronic program guides (EPGs), data, multimedia information, hypermedia links, computer programs, computer data, applications which may be downloaded, program applets, teletext, audio programs, textual information programs, image generating programs, electronic-mail, and voice mail.

Preferably, an encoded program broadcast by the headend 15 is decoded for legitimate users. At a subscriber unit 25, the program is received via an antenna (not shown) or a cable (not shown) as is well known in the art. The subscriber unit 25 preferably includes a set-top box (STB) 30, a television 35 operatively associated with the STB 30, and a removable security element 40, preferably a smart card, which is inserted in a receptacle 45 in the STB 30.

The terms "encode" and "decode" in all of their forms are used throughout the specification and claims in a broad sense to cover all forms of data encoding and decoding, ranging from simple scrambling and descrambling or encoding and decoding to strong encryption and decryption.

Preferably, during time periods in which program viewing is authorized, the STB 30 decodes an encoded program received from the headend 15 under control of the smart card 40, and displays the program in a clear form on the television 35. During time periods in which program viewing is unauthorized, decoding of the encoded program is prevented or not performed, and program viewing is disabled. Preferably, during the time periods in which program viewing is unauthorized, a message 50 indicating that program viewing is unauthorized is displayed on the television 35.

Figure 2:
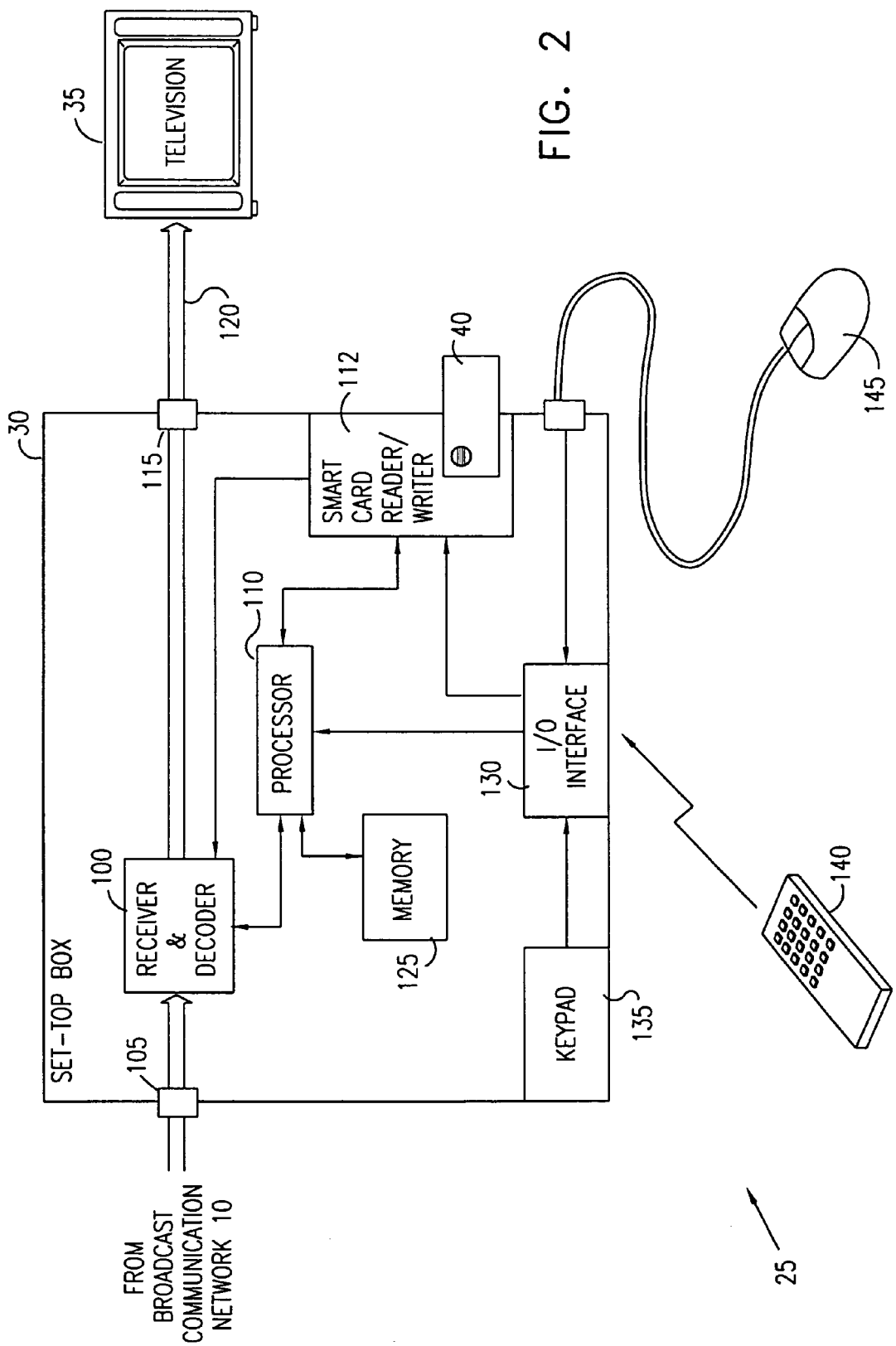
FIG. 2 is a simplified pictorial illustration of a preferred implementation of a portion of a subscriber unit in the broadcast communication network of FIG. 1.

Reference is now additionally made to FIG. 2 which is a simplified pictorial illustration of a preferred implementation of the STB 30 in the subscriber unit 25 which is comprised in the broadcast communication network 10 of FIG. 1.

Preferably, the STB 30 includes a conventional receiver and decoder unit 100 which receives the encoded broadcast program from the broadcast communication network 10 as is well known in the art. The STB 30 typically receives the encoded broadcast program via a cable connector 105. Preferably, the receiver and decoder unit 100 also decodes the encoded program under control of a processor 110 which operates as an internal security element. Alternatively or additionally, the encoded program is decoded under control of the smart card 40 which may be associated with the receiver and decoder unit 100 via a smart card interface 112, preferably a smart card reader/writer or a smart card reader. Typically, the program is provided by the receiver and decoder unit 100 to the television 35 via a connector 115 and a cable 120.

The processor 110 is preferably operatively associated with the following units: the smart card reader/writer 112; a memory 125; and an input/output (I/O) interface 130 which is adapted to receive a conventional user input device. Preferably, inputs received at the I/O interface 130 may be employed to program the processor 110 so as to disable decoding of the program by the receiver and decoder unit 100 for at least one preselected time period. Alternatively or additionally, pre-stored data in the memory 125 or in the smart card 40, or data received from the broadcast communication network 10 may be employed to program the processor 110 so as to determine the at least one preselected time period during which decoding of the program by the receiver and decoder 100 is to be disabled.

It is appreciated that the pre-stored data in the smart card 40 may include data programmed into the smart card 40 during manufacturing, or prior to selling to a user. The pre-stored data may include selected time periods, selected according to user preferences, during which authorization to view programs is to be disabled. The selected time periods may be either determined by a manufacturer or a salesperson, or provided by the user. The selected time periods may, for example, be: periodic, such as every weekend, or every evening between 8:00 PM and 10:00 PM; or specific, such as at a selected time on a specific date.

It is appreciated that disablement of the authorization to view programs as mentioned above is unrelated to and does not include program disablement due to application of a geographic black-out. In a geographic black-out application, which is described for example in the above mentioned U.S. Pat. No. 5,036,537 to Jeffers et al and U.S. Pat. No. 4,989,245 to Bennett, broadcasters block authorization to view a program, for example a sports game, in a region where the sports game is actually played in order to encourage people living in the region where the sports game is actually played to go and watch the game in a stadium where the game is actually played.

Preferably, the inputs received at the I/O interface 130 may be entered by a user by using at least one of the following user input devices: a keypad 135; a remote control unit 140; and a mouse pointer 145. Preferably, each of the keypad 135, the remote control unit 140, and the mouse pointer 145 may be operative to enable input of the at least one preselected time period.

It is appreciated that the at least one preselected time period inputted via at least one of the user input devices may be also stored in the memory 125, or in a smart card memory (not shown) as is well known in the art, and used by the processor 110, or a smart card processor (not shown) as is well known in the art, to determine the time when program viewing authorization is to be prevented. The smart card memory and the smart card processor are typically comprised in the smart card 40.

The operation of the apparatus of FIGS. 1 and 2 is now briefly described. Preferably, a program broadcast from the broadcast communication network 10 is received and decoded at the receiver and decoder 100, and provided to the television 35 for display thereon. Preferably, a user may employ at least one of the keypad 135, the remote control 140 and the mouse pointer 145 to input disabling data including at least a selection of at least one time period during which the user wants to disable authorization to view television programs. Alternatively, the disabling data may be sent from the headend 15 to the subscriber unit 25.

The disabling data may preferably include at least a portion of characteristics of the at least one time period selected by the user, such as, for example, a beginning time of the at least one time period or a "start" time indication and an ending time of the at least one time period or a "stop" time indication. Alternatively, the at least a portion of characteristics of the at least one time period may include a beginning time, and a length of the at least one time period.

Further alternatively or additionally, the characteristics of the at least one time period may be dependent upon viewing history. For example, the at least one time period may begin after the smart card 40 is inserted in the smart card reader/writer 112 for a specified time period, such as four hours, in a day thereby disabling the viewer to watch television more than four hours a day. In such a case, the smart card reader/writer 112 may provide to the processor 110 or to the smart card 40 an indication of the time during which the smart card 40 is inserted in the smart card reader/writer 112, and the smart card 40 or the processor 110 may be operative to calculate the time during which the smart card 40 is inserted in the smart card reader/writer 112 and to disable authorization to view programs on the television 35 for the rest of the day based on the length of time during which the smart card 40 is inserted in the smart card reader/writer 112.

It is appreciated that the characteristics of the at least one time period, however received at the STB 30 or the smart card 40, may preferably be stored in the memory 125 or in the smart card 40 before being used to disable authorization to view programs. Alternatively or additionally, the characteristics of the at least one time period, or a portion thereof, may be specifically addressed from the headend 15 to the STB 30 or the smart card 40 whenever required. In a case that only a portion of the characteristics of the at least one time period is specifically addressed from the headend 15 to the STB 30 or the smart card 40, data resident in the memory 125 or in the smart card 40, and/or the selection inputted by the user, may be combined with the portion of the characteristics of the at least one time period to provide the characteristics of the at least one time period which may be used to disable authorization to view television programs.

Preferably, the disabling data is provided to the processor 110 or to the smart card 40 via the I/O interface 130, and the processor 110, or the smart card processor (not shown) embodied in the smart card 40, determines whether a current time is within the at least one time period. Determination whether the current time is within the at least one time period may be performed, for example, by comparing the beginning time and the ending time included in the disabling data to the current time maintained by an internal clock (not shown) as is well known in the art, wherein the internal clock is preferably embodied in the processor 110 or in the smart card processor. Alternatively, the current time may be derived from clock signals accompanying the program broadcast from the headend 15.

Preferably, as long as the current time is within the at least one time period, the processor 110, or the smart card processor (not shown) as described above, generates a disabling code in response to the selection made by the user. The disabling code is preferably used to prevent or disable decoding of the program by the receiver and decoder 100 and may include, for example, a digital representation of the beginning time and the ending time or a digital representation of the beginning time and a length of the at least one time period. Alternatively, the disabling code may include an incorrect control word (CW) which cannot be used to decode the program thereby maintaining the program in an unintelligible format. The processor 110, or the smart card processor, may also preferably generate a message indicating that viewing authorization is disabled during the at least one time period.

If, however, the current time is not within the at least one time period, the processor 110, or the smart card processor, may either generate a CW which enables decoding of the program, or not interfere in a decoding process performed at the receiver and decoder 100, thereby enabling decoding of the program.

It is appreciated that the processor 110, or the smart card processor, need not check the current time continuously. Rather, time may be checked periodically, such as every second, to determine whether it is within the at least one time period. Preferably, an authorization to view the program may be changed only at a periodic check and not between periodic checks.

In another preferred embodiment of the present invention the at least one time period may be determined as an enabling time period during which program viewing is enabled. In such a case, if the current time is not within the at least one time period, the processor 110, or the smart card processor as described above, may generate a disabling code, as mentioned above, in response to the selection inputted by the user. The disabling code is preferably used to prevent or disable decoding of the program by the receiver and decoder 100 and may include, for example, an incorrect control word (CW) which cannot be used to decode the program thereby maintaining the program in an unintelligible format. The processor 110, or the smart card processor, may also preferably generate a message indicating that viewing authorization is disabled at periods other than the at least one time period.

In still another preferred embodiment of the present invention, the disabling data is associated with the program broadcast from the headend 15. In such a case, the disabling data may include an individually addressed disabling code which is preferably generated at the headend 15 and addressed only to the subscriber unit 25. The individually addressed disabling code may include, for example, a digital representation of the beginning time and the ending time of the at least one time period or a digital representation of the beginning time and a length of the at least one time period. Alternatively, the individually addressed disabling code may include an individually addressed incorrect control word (CW) which cannot be used to decode the program thereby maintaining the program in an unintelligible format.

Preferably, the individually addressed disabling code is received at the receiver and decoder 100 together with the program and is separated from the program by the receiver and decoder 100 to produce a separated individually addressed disabling code. Preferably, after separation, the disabling code is provided to the processor 110, or to the smart card 40, which may be operative to determine whether the disabling code is addressed to the subscriber unit 25.

If the disabling code is addressed to the subscriber unit 25, the processor 110, or the smart card processor embodied in the smart card 40, stores the disabling code in the memory 125 or in the smart card memory. Preferably, the processor 110, or the smart card processor operates in a similar method of operation as mentioned above to determine whether the current time maintained by the internal clock of the processor 110, or the smart card processor, is within the at least one time period. It is appreciated that clock signals determining the current time may be also associated with the program broadcast from the headend 15, and the clock signals may be extracted to provide the current time.

As mentioned above, as long as the current time is within the at least one time period, the processor 110, or the smart card processor, uses the disabling code to prevent decoding of the program by the receiver and decoder 100. The processor 110, or the smart card processor, may also preferably generate a message indicating that viewing authorization is disabled during the at least one time period.

If, however, the current time is not within the at least one time period, the processor 110, or the smart card processor, may either generate a CW which enables decoding of the program, or not interfere in the decoding process performed at the receiver and decoder 100, thereby enabling decoding of the program.

It is appreciated that the disabling data may include addressed restriction information which is generated at the headend 15 and is individually addressed to the subscriber unit 25. Preferably, the addressed restriction information may be included in an Entitlement Control Message (ECM) or an Entitlement Management Message (EMM) as is well known in the art, for example, from the above mentioned Eurocrypt access control system for the MAC/Packet family. The ECM typically includes a cryptogram of the CW.

It is appreciated that the addressed restriction information may either include the disabling code, or a function of the disabling code from which the disabling code may be derived by the processor 110 or the smart card processor. Preferably, the disabling code determines conditions for disabling viewing of television programs, such as times when viewing is disabled as mentioned above, and channels at which viewing is disabled.

Preferably, the disabling code may be associated with a payment code determining a payment rate. Accordingly, only users who request a program viewing disabling service, and pay for the service, may disable viewing at selected time periods. Alternatively or additionally, the payment rate may also determine a rate which is either reduced or increased with respect to a regular rate of the program as decided by a program provider.

Preferably, disabling authorization to view the program in a clear form occurs at any channel to which the STB 30 is tuned during the at least one time period. Alternatively, only pay programs may be disabled from viewing in a clear form at any channel to which the STB 30 is tuned during the at least one time period.

It is appreciated that the at least one time period preselected by the user may include a periodic time period, such as selected hours during weekends, or whole weekends. Typically, the at least one time period is selected to immediately follow an additional time period during which programs broadcast via the broadcast communication network are enabled in a clear form.

Preferably, disablement of the authorization to view the program at selected time periods may be canceled by the user, either by inputting data which cancels the at least one time period or by placing a telephone call to the headend and requesting to cancel the service which offers the possibility of disabling authorization to view programs at selected time periods.

Figure 3:
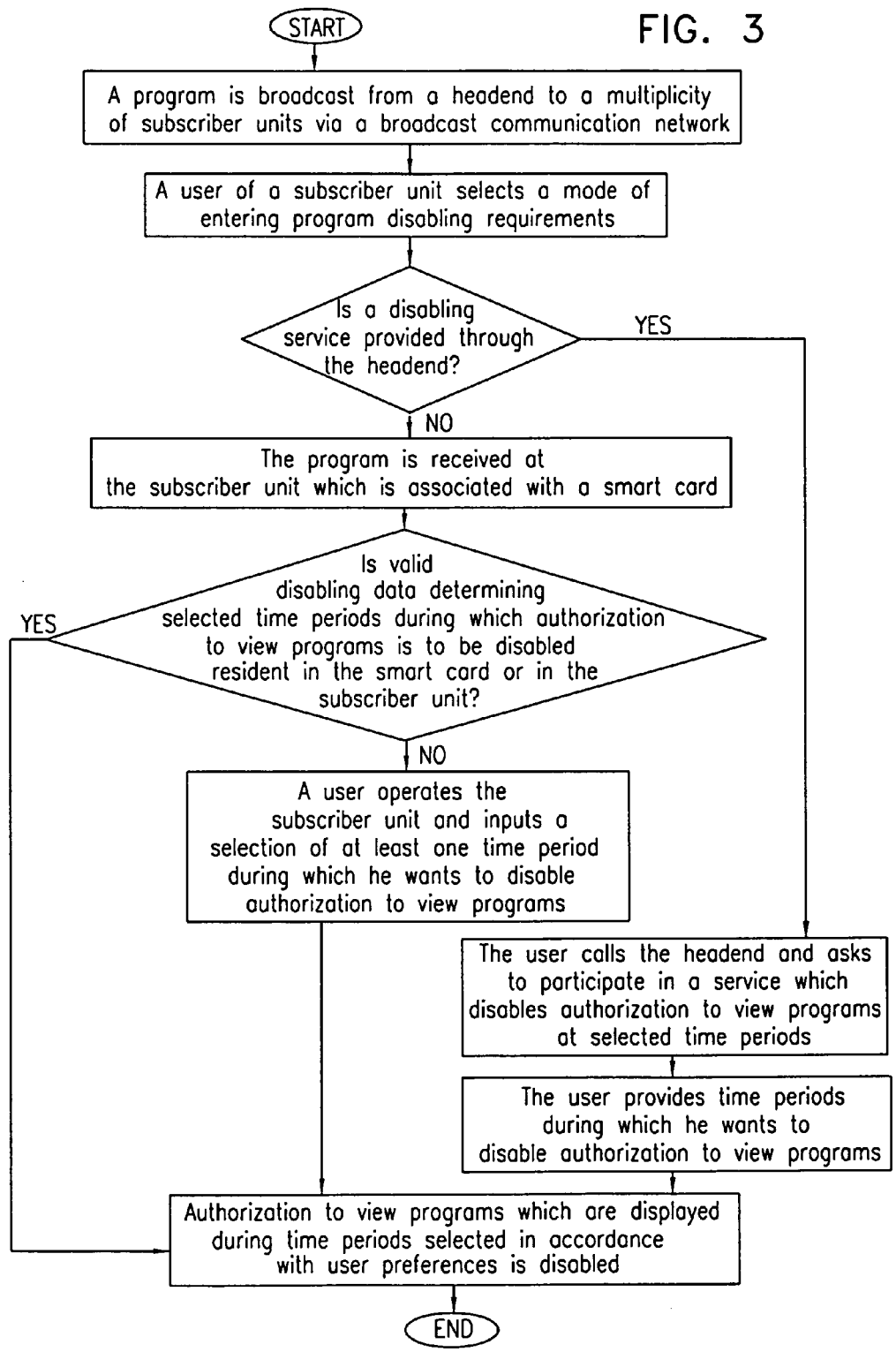
FIG. 3 is a simplified flow chart illustration of a preferred method of operation of the apparatus of FIGS. 1 and 2.

Reference is now made to FIG. 3 which is a simplified flow chart illustration of a preferred method of operation of the apparatus of FIGS. 1 and 2.

Preferably, a program is broadcast from a headend to a multiplicity of subscriber units via a broadcast communication network. A user of one of the multiplicity of subscriber units may preferably select at least one of the following modes of entering program disabling requirements:

In a first mode of entering program disabling requirements, if the headend provides a service which disables authorization to view programs at selected time periods, the user may call the headend and ask to participate in the service. In such a case, the user may be required to provide at least one time period during which he wants to disable authorization to view programs. Preferably, the headend may transmit characteristics of the at least one time period to the one of the multiplicity of subscriber units, and the characteristics of the at least one time period may be stored in a smart card used with the one of the multiplicity of subscriber units, or in a memory embodied in the one of the multiplicity of subscriber units, and used to disable authorization to view programs during the at least one time period. Alternatively, the headend may associate an individually addressed disabling code to programs transmitted during the at least one time period so that authorization to view the programs associated with the individually addressed disabling code during the at least one time period is disabled at addressed subscriber units.

In a second mode of entering program disabling requirements, the user may provide at least one time period during which he wants to disable authorization to view programs at the time of purchase of the smart card. In such a case, disabling data is loaded in the smart card at the time of purchase of the smart card, and when the smart card is used, authorization to view programs which are displayed during the at least one time period determined by the user is disabled.

In a third mode of entering program disabling requirements, if disabling data is not resident in the smart card or in the memory embodied in the one of the multiplicity of subscriber units, or if the user wants to change at least part of disabling data resident in the smart card or in the memory embodied in the one of the multiplicity of subscriber units, the user may operate the one of the multiplicity of subscriber units and input a selection of at least one time period during which he wants to disable authorization to view programs. Then, authorization to view programs transmitted during the at least one time period is preferably disabled.

It is appreciated that in any of the above mentioned modes characteristics of at least one time period including a determination of the at least one time period may be stored in the smart card or in the memory embodied in the one of the multiplicity of subscriber units.

Preferably, once the at least one time period during which the user wants to disable authorization to view programs is entered and is valid, authorization to view programs which are displayed during the at least one time period is disabled.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow.

What is claimed is:

1. An access control method for use with a broadcast communication network, the method comprising:
  receiving an encoded program at a subscriber unit via the broadcast communication network;
  preventing decoding of the encoded program at the subscriber unit for at least one preselected time period, preselected in accordance with a preference of a user of the subscriber unit,
  wherein the step of preventing decoding comprises:
    disabling display of the program in a clear form at the subscriber unit for said at least one preselected time period in response to a selection inputted by the user;
    generating a disabling code in response to said selection inputted by the user; and
    employing said disabling code to prevent decoding of said program for said at least one preselected time period, and
  the disabling code is associated with a payment code determining a payment rate.

2. A method according to claim 1 and wherein said step of preventing decoding comprises the step of disabling display of the program in a clear form at the subscriber unit for said at least one preselected time period in response to disabling data inputted at a headend of the broadcast communication network.

3. A method according to claim 2 and wherein said disabling data comprises addressed restriction information which is individually addressed to the subscriber unit.

4. A method according to claim 1 and wherein said step of preventing decoding comprises the step of disabling display of the program in a clear form at the subscriber unit for said at least one preselected time period in response to disabling data resident in a removable security element which is operatively associated with said subscriber unit.

5. A method according to claim 4 and wherein said disabling data resident in the removable security element is stored in the removable security element before the removable security element is provided to the user for use thereby.

6. A method according to claim 2 and wherein said disabling data comprises at least a portion of characteristics of the at least one preselected time period.

7. A method according to claim 4 and wherein said disabling data comprises characteristics of the at least one preselected time period.

8. A method according to claim 6 and wherein said characteristics of the at least one preselected time period comprise at least one of the following:
a beginning time of the at least one preselected time period and an ending time of the at least one preselected time period; and
a beginning time of the at least one preselected time period and a length of the at least one preselected time period.

9. A method according to claim 7 and wherein said characteristics of the at least one preselected time period comprises at least one of the following:
a beginning time of the at least one preselected time period and an ending time of the at least one preselected time period;
a beginning time of the at least one preselected time period and a length of the at least one preselected time period; and
a beginning time of the at least one preselected time period, beginning after the removable security element is inserted in a removable security element receptacle in said subscriber unit for a specified time period, and a time remaining to an end of a current day.

10. A method according to claim 1 and wherein said step of preventing decoding comprises the step of disabling display of a program in a clear form at a channel to which the subscriber unit is tuned during said at least one preselected time period.

11. A method according to claim 1 and wherein said step of preventing decoding comprises the step of disabling display of a pay program in a clear form at a channel to which the subscriber unit is tuned during said at least one preselected time period.

12. A method according to claim 1 and wherein said program comprises at least one of the following: a television program; a pay television program; a commercial; a video clip; a program guide; an electronic program guide (EPG); data; multimedia information; a hypermedia link; a computer program; computer data; an application which may be downloaded; a program applet; teletext information; an audio program; a textual information program; an image generating program; electronic-mail; and voice mail.

13. A method according to claim 1 and wherein said at least one preselected time period comprises at least one of the following: a periodic time period; and a specific time period.

14. A method according to claim 2 and wherein said step of preventing decoding comprises the steps of:
transmitting the program associated with an individually addressed disabling code from the headend;
receiving the program with the associated individually addressed disabling code at the subscriber unit;
separating the individually addressed disabling code from the program to produce a separated individually addressed disabling code;
processing the separated individually addressed disabling code to determine whether the individually addressed disabling code is addressed to the subscriber unit; and
preventing decoding of said program for said at least one preselected time period if said individually addressed disabling code is addressed to the subscriber unit.

15. A method according to claim 14 and wherein said disabling code is associated with a payment code determining a payment rate.

16. A method according to claim 4 and wherein said step of preventing decoding comprises the steps of:
generating a disabling code in response to said disabling data resident in the removable security element; and
employing said disabling code to prevent decoding of said program for said at least one preselected time period.

17. A method according to claim 14 and wherein said disabling code is comprised in one of the following: an Entitlement Control Message (ECM); and an Entitlement Management Message (EMM).

18. A method according to claim 1 and wherein said at least one preselected time period is selected to immediately follow an additional time period during which programs broadcast via the broadcast communication network are displayed in a clear form.

19. Access control apparatus for use with a broadcast communication network, the apparatus comprising:
a receiver receiving an encoded program at a subscriber unit via the broadcast communication network;
a processor operatively associated with the receiver and operative to prevent decoding of the encoded program at the subscriber unit for at least one preselected time period, preselected in accordance with a preference of a user of the subscriber unit, the processor being operative to prevent decoding by:
disabling display of the program in a clear form at the subscriber unit for said at least one preselected time period in response to a selection inputted by the user;
generating a disabling code in response to said selection inputted by the user; and
employing said disabling code to prevent decoding of said program for said at least one preselected time period,
wherein the disabling code is associated with a payment code determining a payment rate.

* * * * *